United States Patent [19]

Loblein

[11] Patent Number: 5,048,903
[45] Date of Patent: * Sep. 17, 1991

[54] TRASH ORGANIZER

[76] Inventor: Eldon Loblein, 6 Jackson Ave., Belfast, Me. 04915

[*] Notice: The portion of the term of this patent subsequent to May 7, 2008 has been disclaimed.

[21] Appl. No.: 613,101

[22] Filed: Nov. 13, 1990

Related U.S. Application Data

[63] Continuation-in-part of Ser. No. 472,760, Jan. 31, 1990, Pat. No. 5,013,102.

[51] Int. Cl.$^5$ .............................................. A47B 81/00
[52] U.S. Cl. ................................................. 312/234.1
[58] Field of Search ..................... 312/234, 234.1, 305, 312/319

[56] References Cited

U.S. PATENT DOCUMENTS

| | | |
|---|---|---|
| 56,863 | 9/1896 | Smith .............................. 312/365 X |
| 736,301 | 8/1903 | Sanford . |
| 922,888 | 5/1909 | Grunwaldt . |
| 1,219,176 | 3/1917 | Sharp . |
| 1,436,026 | 11/1922 | Ferge et al. ...................... 312/305 X |
| 1,559,705 | 11/1925 | Jackson ........................... 312/305 X |
| 1,978,695 | 10/1934 | Clark . |
| 2,042,637 | 6/1936 | Scurlock . |
| 2,110,921 | 3/1938 | Scurlock . |
| 2,605,160 | 7/1952 | Boddy . |
| 2,736,628 | 2/1956 | Fadden, Jr. . |
| 3,506,231 | 4/1970 | Bonneau . |
| 3,642,145 | 2/1972 | Shelton . |
| 3,972,419 | 8/1976 | Short . |
| 4,066,172 | 1/1978 | Howard . |

Primary Examiner—Joseph Falk
Attorney, Agent, or Firm—Fish & Richardson

[57] ABSTRACT

An under-counter kitchen trash appliance that facilitates sorting of household waste for recycling. Six triangular waste cans are nested in a cylindrical array on a revolving base and enclosed in an independent housing beneath a new or existing kitchen counter, much like a dishwasher. The counter has a trash drop hole above the revolvable nest of cans. The hole is covered by a hinged top. A visible index gauge indicates the rotated positions of the cans.

7 Claims, 6 Drawing Sheets

TRASH ORGANIZER

CROSS REFERENCE TO RELATED APPLICATIONS

This application is a continuation in part of U.S. application Ser. No. 07/472,760, filed Jan. 31, 1990, now U.S. Pat. No. 5,013,102.

BACKGROUND OF THE INVENTION

My invention relates to trash collection and disposal facilities. More particularly, it relates to an apparatus for mounting beneath a kitchen counter top for receiving and classifying trash through an opening in the counter top for the purposes of recycling the trash.

SUMMARY OF THE INVENTION

In general, the invention features, in combination with a counter top of a domestic kitchen or the like, a trash collector and organizer, referred to herein as "the Recycler TM " or organizer. The organizer comprises a revolvable base which supports a circular nest of generally triangularly shaped open top trash cans and a mount for the base adapted to hold the base at a predetermined level and location beneath the counter top; the counter top includes a trash receiving drop hole with a hinged cover adapted to conceal the drop hole when closed and to expose the drop hole to receive trash when open; a revolving mechanism having a push button controlled drive motor is provided for revolving the base so as to selectively locate the open mouth of any individual can directly beneath the drop hole; an indexing means, actuated by the revolving movement of the base, assists the user in selecting a can, such indexing means comprising a visible rotatable gauge bearing indicia and a drive from the revolving mechanism for rotating the gauge; and a door, when open, facilitates the removal of individual cans from the base from the front beneath the counter and, when closed, serves to conceal the organizer from view.

In preferred embodiments, the gauge is located beneath a clear plastic cover flush with the counter top adjacent the drop hole and is mounted at the top of an index drive shaft actuated by the drive motor in synchronization with the revolving base. Indicia on the gauge, which indicate different types of trash, are visible through the clear plastic cover, one of the indicia being aligned with a mark on the gauge to indicate which can is positioned beneath the drop hole. The push button control is likewise located flush with the counter top in a circular display surrounding the index gauge. Finally, each of the trash cans is provided with a handle on its side to facilitate its manual removal from and replacement on the base through the door, and at least one of the trash cans is different in size than the others for the collection of larger or smaller categories of waste materials.

Still further objects, features and advantages of the invention will become apparent from the following detailed description of a presently preferred embodiment taken in conjunction with the accompanying drawings.

DETAILED DESCRIPTION OF THE PREFERRED EMBODIMENT

Figure 2:
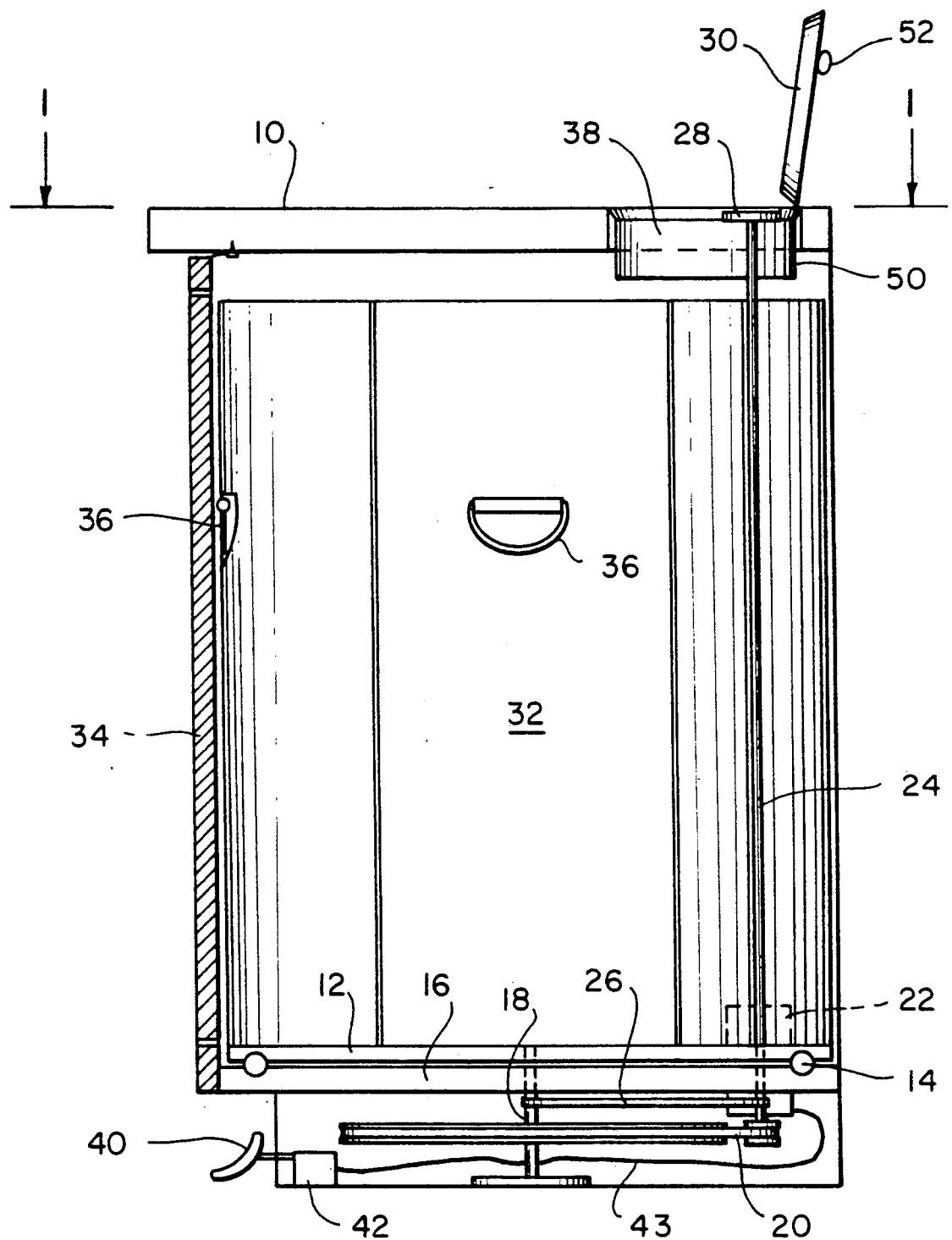
FIG. 2 is a vertical sectional view taken on line 2—2 of FIG. 1 with the door closed.

Referring to FIG. 2, the apparatus of the invention, i.e., the Recycler TM, is adapted to be mounted beneath the typical counter top 10 of a household kitchen. A circular base 12 is mounted to revolve on ball bearings 14 received in a support 16 through which passes a vertical main drive shaft 18. The base 12 is revolved by a main belt drive 20 which is driven by an indexing motor 22 (shown partly in dotted lines). The motor 22 is also coupled to an index drive shaft 24 through an index drive belt 26. The latter shaft 24 drives a circular index gauge disc 28 to selected rotated positions.

Figure 1:
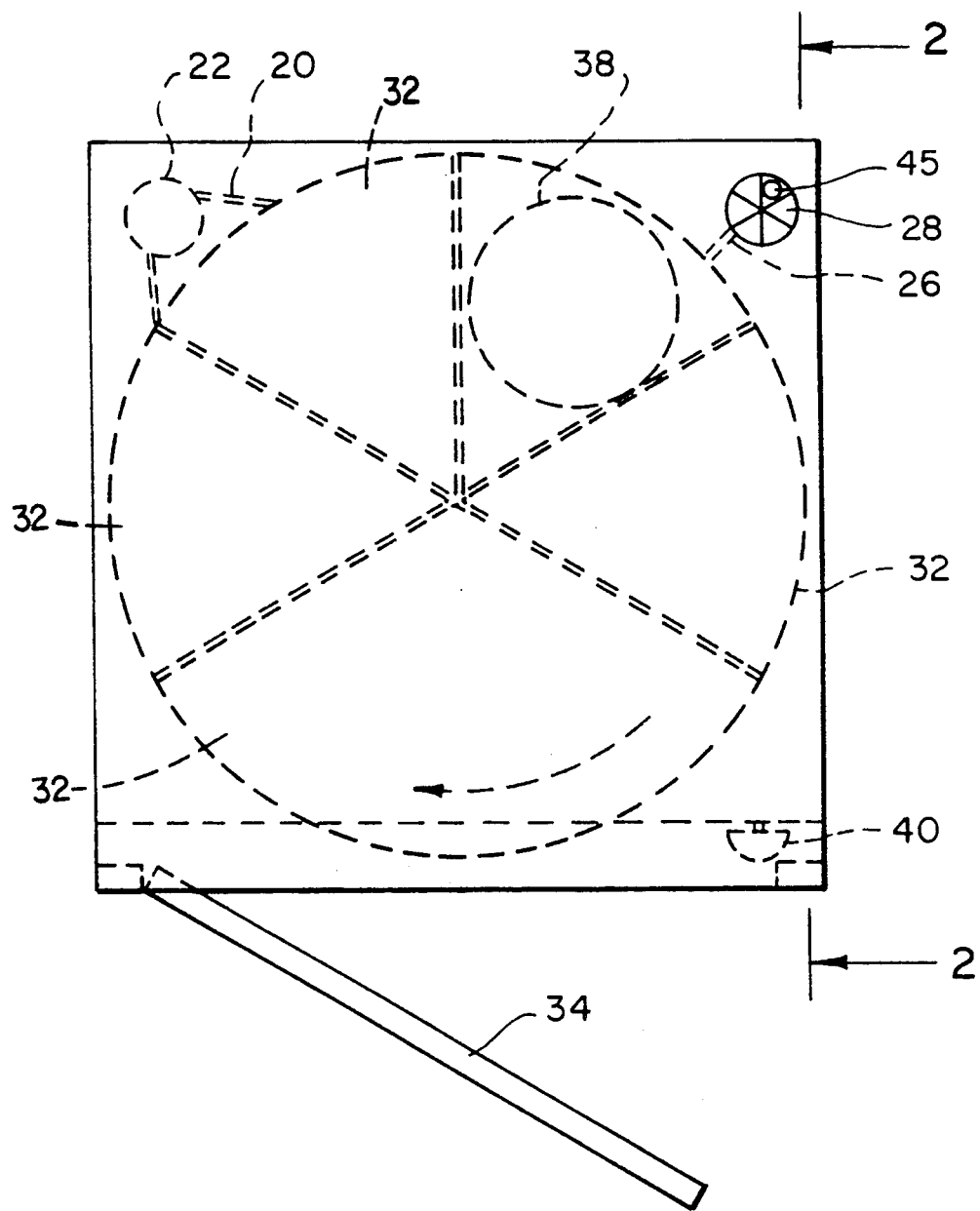
FIG. 1 is a horizontal cross-sectional view of the organizer, including a pedal control arrangement, taken on line 1—1 of FIG. 2 with the door opened.
Figure 3:
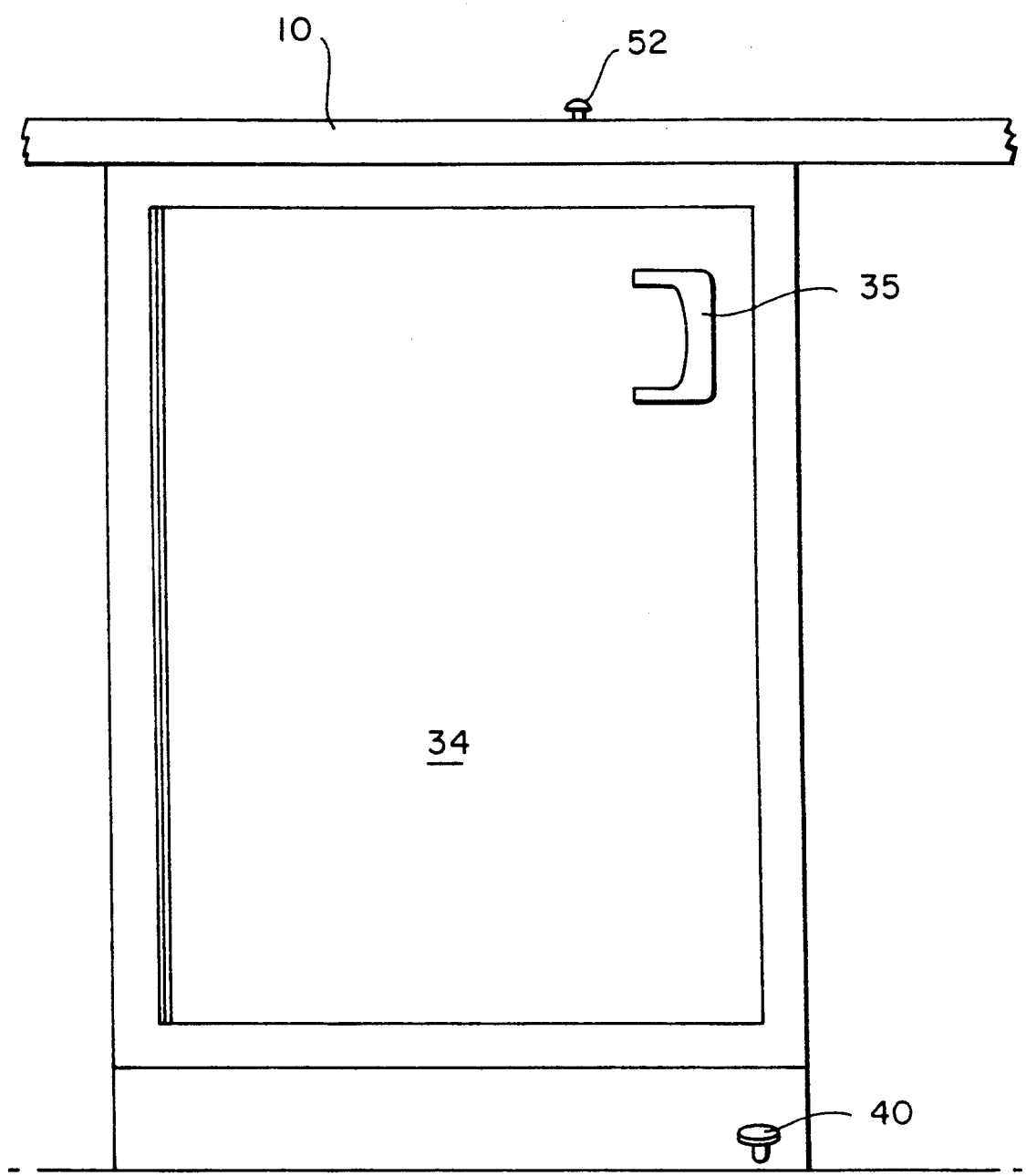
FIG. 3 is a front view of the organizer of FIGS. 1 and 2 with the door closed.

Referring to FIGS. 1-3, nested on the base 12 are triangularly shaped trash cans 32 which fit together to form a cylindrical array. Different types of trash may be dropped individually into a selected can 32 for recycling. As shown, separate cans for plastic, metal, glass, organic material and paper (the last being larger than the others) are provided. A door 34 at the front of the counter, beneath the counter top 10, is operated by a door handle 35 and provides access to whichever can 32 is located at the moment opposite the door opening. Each can 32 has a trash can handle 36 for grasping to facilitate the selective individual removal of the can from the array.

A trash drop hole 38 is provided in the counter top 10. The hole 38 is covered by a hinged top 30 when not in use. In order to rotate the cans 32 to desired positions beneath the trash drop hole 38, a user can activate the indexing motor 22 by stepping on a pedal 40 which controls a switch box 42 that energizes a power line 43 and causes the motor 22 to revolve the base 12. Once the desired open can 32 is positioned below the trash drop hole 38, the user releases the pedal 40 to stop the motor and deposits his trash through the trash drop hole into the can.

Figure 4:
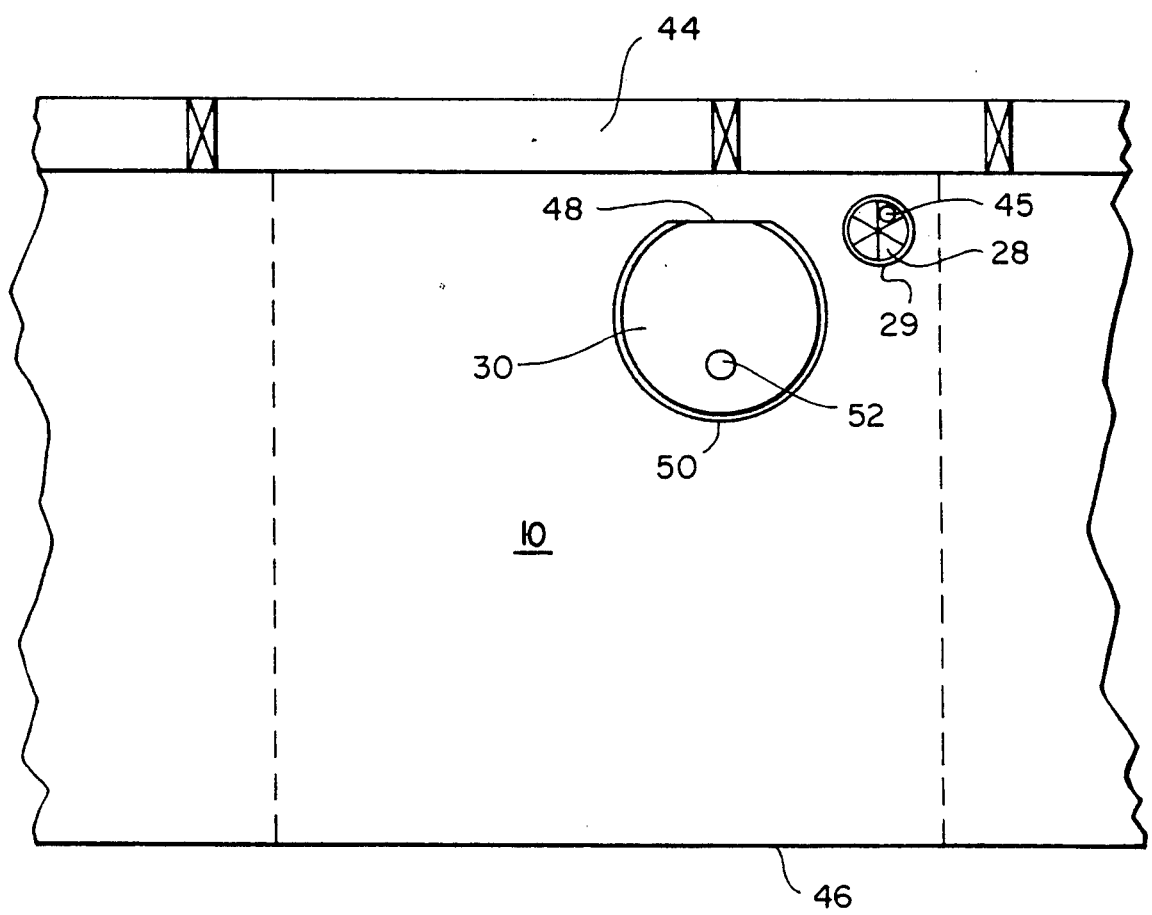
FIG. 4 is a top view of the portion of a kitchen counter top which covers the organizer of FIGS. 1-3.

Referring to FIG. 4, the entire organizer is concealed in the kitchen counter volume between a wall 44 and the front edge 46 of the counter 10. The trash drop cover 30 is hinged at hinge 48 to close against a collar 50 in the counter 10. The cover 30 may be manually swung between its open and closed positions by grasping knob 52 on the cover to lift or lower the cover. Located adjacent to the cover 30 is the rotatable gauge disc 28 for indicating to the user the rotative positions of the cans. A clear plastic cover 29 is mounted flush with the counter top above the disc so as to reveal the indicia marked on the disc's upper surface. A black circle or other mark 45 on the plastic cover 29 represents the drop hole 38 in the counter top 10 so that the user can recognize which can 32 is positioned under the drop hole at any particular moment. Viewed through the plastic cover 29 are six triangular areas on a revolving circular display on the surface of the disc 28, each area carrying a design representing a different trash category. For example, a pictorial display of a bottle (for glass), a can (for metal), a newspaper (for paper), a sandwich (for organic waste), and so on are used simply to identify each category. As the nested cans are revolved by the mechanism described, successive pictures appear beneath the black circle 45 on the plastic gauge cover 29. When the desired picture is aligned with the circle, revolving motion of the base 12 is halted by releasing the foot pedal 40. Trash of the desired category may now be dropped through the hole 38 in the counter top 10. The foot pedal and index gauge arrangement provides the advantage of leaving the user's hands free to prepare food, cook, clean, etc. while the base 12 rotates.

When the cans 32 become full of trash, each may be removed by hand through the door 34 and emptied into larger storage cans awaiting pickup by a municipality. In the preferred embodiment, a double-size can and a half-size can may be provided to accommodate larger or smaller waste categories. In addition, the cans preferably should be constructed of light weight, durable plastic.

Figure 5:
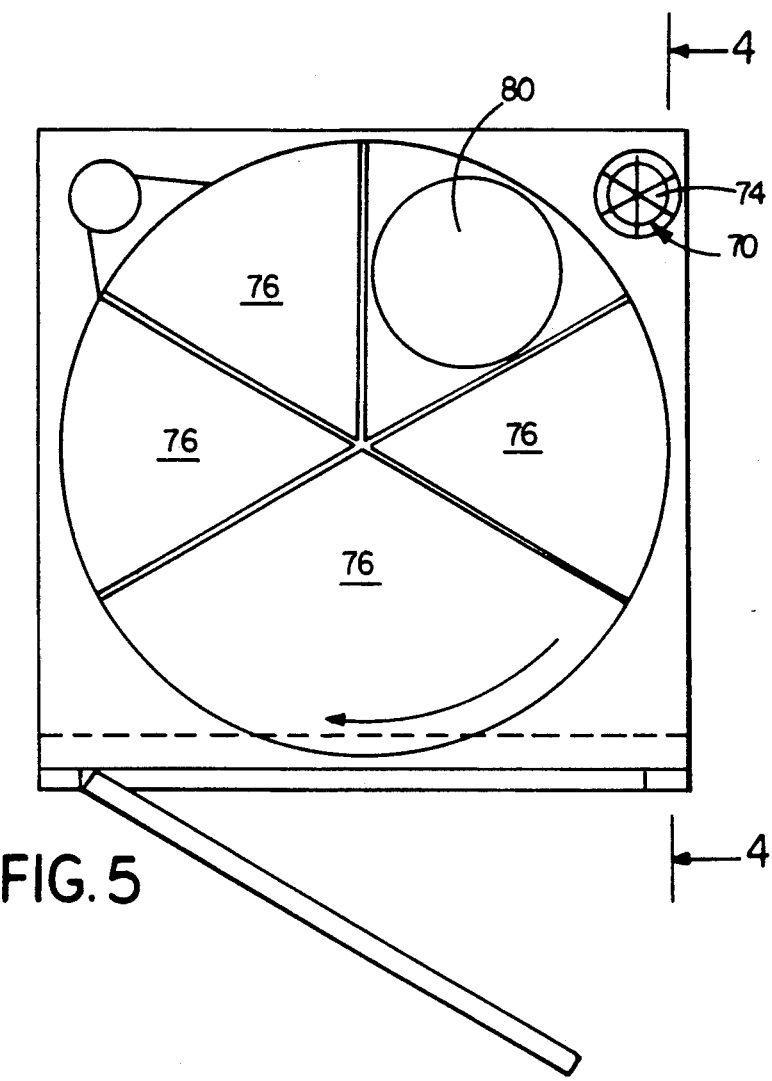
FIG. 5 is a horizontal cross-sectional view of the organizer, including a push button control arrangement, taken on line 3—3 of FIG. 6 with the door open.
Figure 5A:
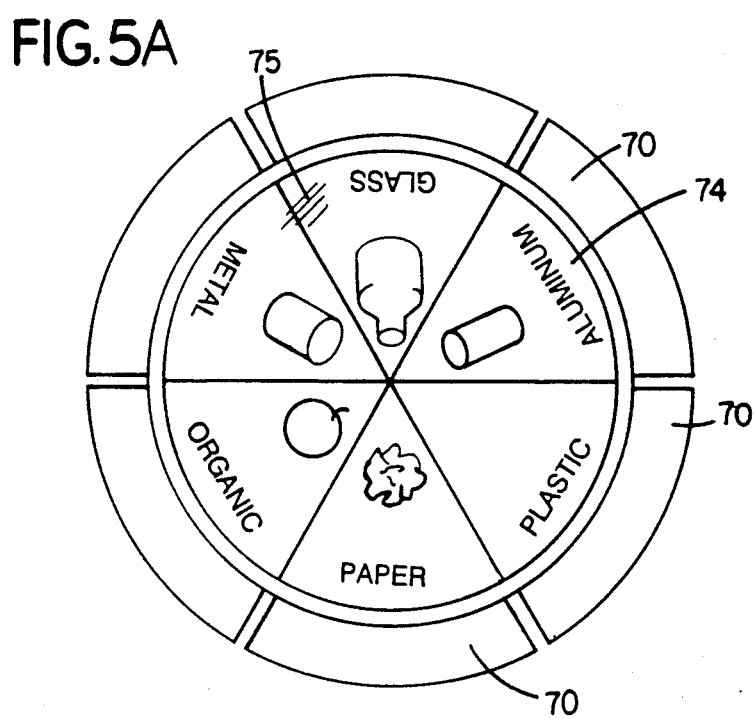
FIG. 5A is an enlarged plan view of the push button control arrangement.

In an alternative embodiment, the Recycler TM apparatus is controlled by an array of water-proof push buttons provided flush with the counter top in a circular display surrounding the index gauge disc 74, rather than by a pedal arrangement, but is otherwise substantially as described above in connection with FIGS. 1-4. Referring to FIGS. 5 and 5A, the array of water-proof push buttons 70 is located in a circular arrangement surrounding the index gauge disc 74. To select a specific can, the user presses the push button adjacent to the proper trash category design displayed on the index gauge disc 74 beneath a clear plastic cover 75.

Figure 6:
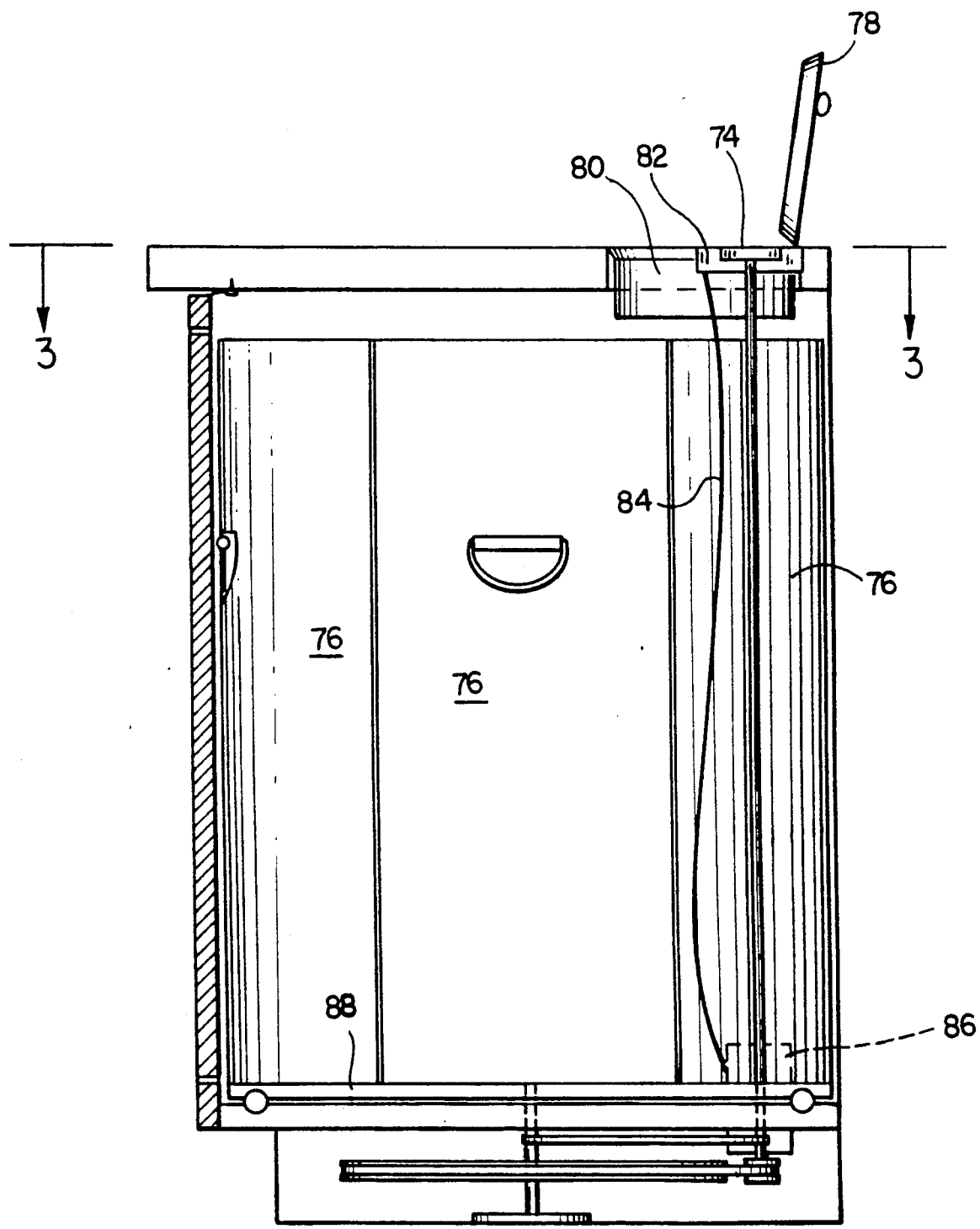
FIG. 6 is a vertical cross-sectional view taken on line 4—4 of FIG. 5 with the door closed.

Referring to FIG. 6, to operate the Recycler TM apparatus, the user determines whether the selected design beneath the black circle 45 (FIG. 5) on the gauge disc 74 corresponds to the type of trash to be discarded. If so, he simply opens trash drop cover 78 and deposits the trash through the trash drop hole 80. If not, he presses the push button 70 (FIGS. 5 and 5A) beside the design that corresponds to the type of trash he wants to deposit, regardless of the current position of the gauge disc 74. In response, a switch box 82 connected to the push button array energizes a power line 84 that causes a motor 86 to selectively revolve the base 88 on which the cans 76 are supported so that the desired can is positioned under the trash drop hole 80. The user then opens the cover 78 and deposits the trash.

The push button arrangement described above provides the advantage of being out of the way of the feet of passers-by, and, furthermore, is out of the reach of small children. In addition, the push button arrangement automatically positions the desired can beneath the drop hole without requiring the user to monitor the revolving gauge disc. It will be appreciated that a dial arrangement could similarly be used in conjunction with the gauge disc to select a particular can and activate the motor to position the can. Other possible features of the invention are described below.

Optional Features

A larger self-contained island model Recycler TM, e.g., measuring 36 inches square, can be provided to increase the capacity and number of different trash categories available, while the top of the Recycler TM apparatus provides additional counter top work space in the kitchen. A chopping-block or a top of DuPont Corian ® material or the like, for example, would be both attractive and durable.

A standard size can made smaller, e.g., by providing a false bottom, can also be provided for, e.g., the storage of organic waste, so that the user is required to remove and empty the can more frequently, thereby minimizing odors from decay. Furthermore, the Recycler TM apparatus can include rubber seals (not shown) surrounding front door 34 and trash drop lid 30 (FIG. 2) to contain any odor and prevent insects from becoming a problem. A vent pipe connected to the kitchen's sink drain is also a desirable optional feature.

While there has herein been disclosed and described a presently preferred embodiment of the invention, it will nevertheless be understood that the same is by way of illustration and not by way of limitation and it is intended that the scope of the invention be limited only by the proper interpretation to be accorded the appended claims.

What is claimed is:

1. In combination with a counter top of a domestic kitchen or the like, a trash collector and organizer to facilitate recycling, said organizer comprising:
    a revolvable base adapted to support a circular nest of generally triangularly shaped open top trash cans,
    a mount for said base holding the same at a predetermined level and location beneath the counter top,
    said counter top having a trash drop hole at a preselected location above said open cans,
    a top cover hinged to the counter top adapted to conceal said drop hole when closed and to expose said drop hole to receive trash when open,
    a mechanism for revolving said base so as selectively to locate the open mouth of any individual can directly beneath said drop hole,
    indexing means actuated by the revolving movement of said base to assist in the selection of the cans, said indexing means comprising
    a rotatable indicia bearing gauge and
    a drive from said revolving mechanism for rotating said gauge,
    said revolving mechanism having a push button controlled drive motor for revolving the can supporting base to selected rotated positions while simultaneously actuating said indexing means, and
    a door which, when open, facilitates the removal of individual cans from said base from front beneath the counter and which, when closed, serves to conceal the collector and organizer from view.

2. The combination as claims in claim 1 wherein said gauge is located beneath a clear plastic cover flush with the counter top adjacent said drop hole and mounted at the top of an index drive shaft actuated by said drive motor in synchronization with said revolving base, its indicia being visible through said clear plastic cover.

3. The combination as claimed in claim 1 wherein each of said trash cans is provided with a handle on its side to facilitate its manual removal from and replacement on said base through said door.

4. The combination as claimed in claim 1 wherein at least one of said trash cans is different in size than the others for the collection of larger or smaller categories of waste materials.

5. The combination as claimed in claim 2 wherein said gauge carries on its surface different designs to indicate different types of trash and said clear plastic cover is provided with a visible mark to facilitate aligning the desired can with the drop hole.

6. The combination as claimed in claim 1 wherein said push button control is located in a circular arrangement flush with the counter top and surrounding said gauge.

7. The combination as claimed in claim 6 wherein said push button control includes a plurality of push buttons.

* * * * *

UNITED STATES PATENT AND TRADEMARK OFFICE
CERTIFICATE OF CORRECTION

PATENT NO.   : 5,048,903

DATED        : 09/17/91

INVENTOR(S)  : Eldon Loblein

It is certified that error appears in the above-identified patent and that said Letters Patent is hereby corrected as shown below:

On the title page, item [56]:
In reference cited, "56,863", should be --568,631--.

Signed and Sealed this

Twenty-third Day of March, 1993

Attest:

STEPHEN G. KUNIN

*Attesting Officer*              Acting Commissioner of Patents and Trademarks